May 1, 1951  M. S. WOLK  2,551,482
FILM VIEWING EDITOR
Filed Feb. 21, 1949  2 Sheets-Sheet 1

INVENTOR.
Michael S. Wolk
BY
atty.

May 1, 1951 M. S. WOLK 2,551,482
FILM VIEWING EDITOR
Filed Feb. 21, 1949 2 Sheets-Sheet 2
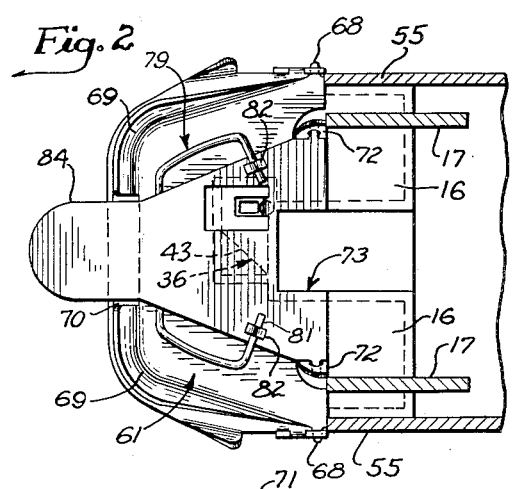
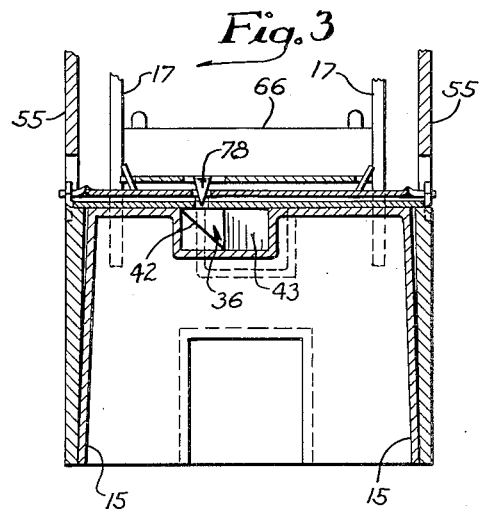
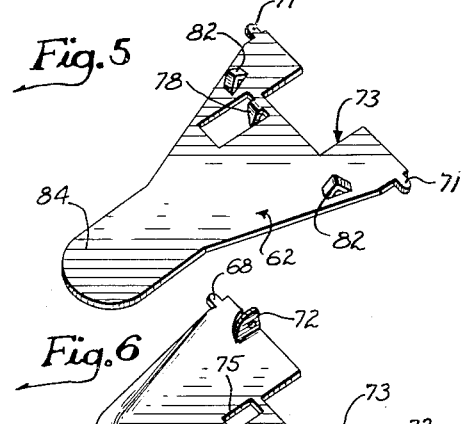
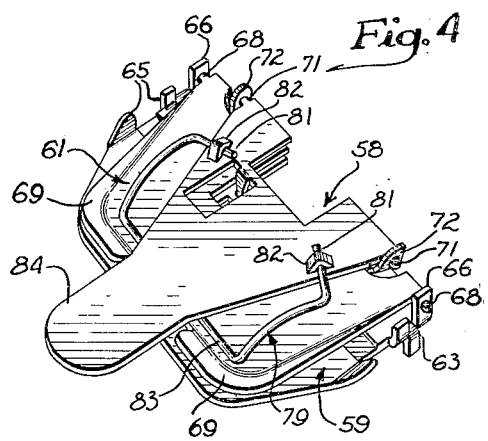
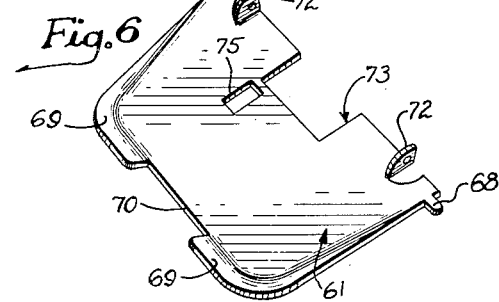
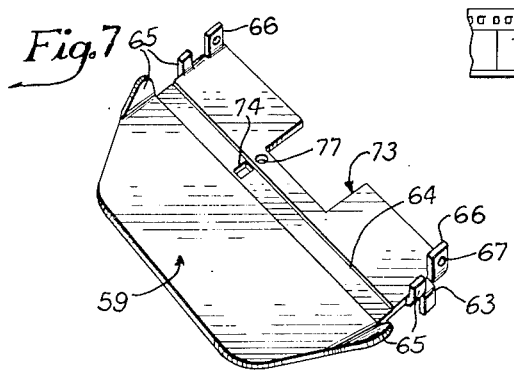
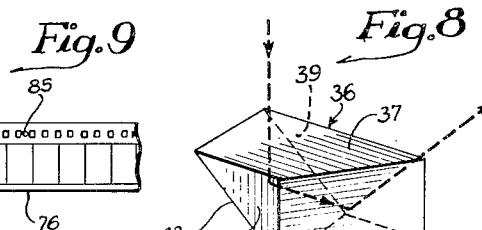
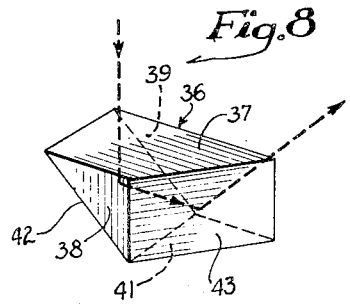
INVENTOR.
Michael S. Wolk
BY
Atty.

Patented May 1, 1951

2,551,482

UNITED STATES PATENT OFFICE 2,551,482

FILM VIEWING EDITOR

Michael S. Wolk, Chicago, Ill.

Application February 21, 1949, Serial No. 77,579

5 Claims. (Cl. 88—14)

The present invention relates to improvements in film viewing editors and more particularly to a novelly constructed viewing and marking device used in editing motion picture film.

It is an object of the present invention to provide a film viewing editor with novel means to project an image upon a viewing screen, which means involves the use of a prism and a mirror as distinguished from known prior devices using mirrors only.

Another object is to provide a film carrier assembly capable of easy insertion and removal from a film viewing editor.

Another object is to provide a film carrier with novel structural features adapting it to be opened and closed readily.

Another object is to provide a film carrier consisting of hingedly connected lower and upper plates with novelly constructed hingedly mounted film marking means.

Another object of the invention is to provide a film viewing editor with novel means for projecting the image upon a viewing screen.

Another object is to provide a novel combination film carrier and marking device.

Another object is to provide a novelly constructed, rugged and efficient film viewing editor.

Other and further objects of the present invention will be apparent from the following description and claims and are illustrated in the accompanying drawings, which by way of illustration show a preferred embodiment and the principle thereof and which is considered to be the best mode contemplated for applying that principle. Other embodiments of the invention embodying the same principle may be used and structural changes may be made as desired by those skilled in the art without departing from the present invention and the purview of the appended claims.

In the drawings:

Fig. 2 is a horizontal sectional view through the film receiving end of the film viewing editor, taken substantially on line 2—2 of Fig. 1.

Fig. 3 is a vertical fragmentary sectional view of the film viewing editor, taken substantially on line 3—3 of Fig. 1.

Fig. 4 is a perspective view of the film carrier.

Figure 1:
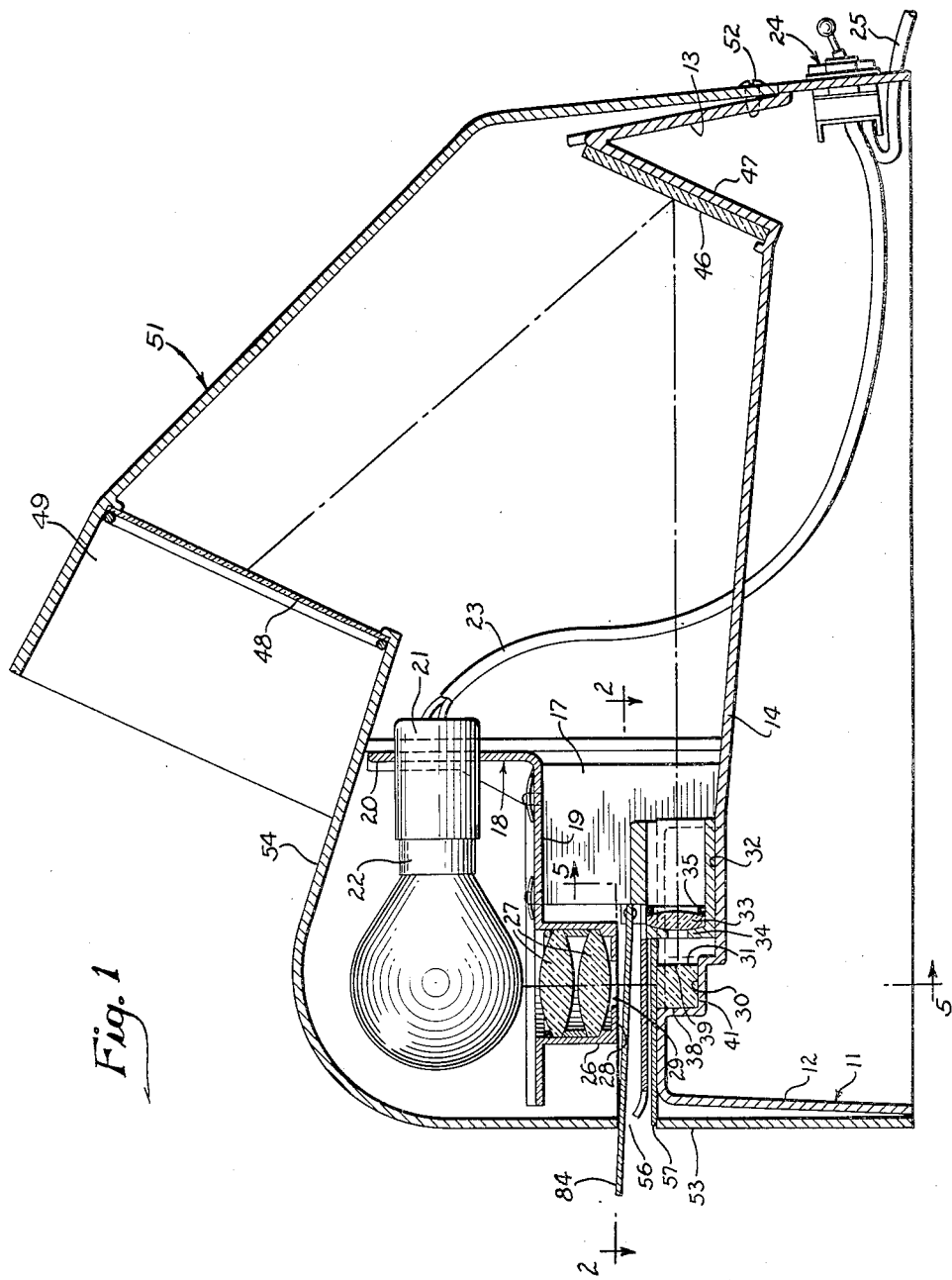
Fig. 1 is a vertical longitudinal central sectional view through a film viewing editor embodying features of the present invention.

Figs. 5, 6, and 7 are, respectively, perspective views of the three elements constituting the film carrier shown in Fig. 4.

Fig. 8 is a perspective view of the prism used in the film viewing editor.

Fig. 9 is a view of a fragment of film illustrating the marking provided thereon by the device of the present invention.

Referring to the accompanying drawings and particularly to Fig. 1, the film viewing editor illustrated includes a hollow, cast base 11 which is substantially rectangular in shape and includes a front wall 12, a back wall 13, a top wall 14, and side walls 15. The top wall 14 has a pair of transversely spaced apart upstanding bosses 16 and wall portions 17 arranged rearwardly of the front wall 12. These wall portions are adapted to provide a mounting for a condensing lens supporting frame 18 which includes a horizontally disposed area 19 and a substantially vertical upstanding flange 20. The flange 20 is suitably apertured to receive therethrough a socket 21 adapted to receive in disengageable connection therewith a conventional lamp bulb 22. The lamp bulb is, of course, connected by lead wire 23 to a switch 24 mounted in the back wall 13 of the base. A current supply line 25 is connected to said switch and extends out through an opening in said back wall for connection with a source of electric current.

The horizontally disposed portion 19 of the condensing lens mount is provided with a cylindrical well 26 within which is arranged a pair of condensing lenses 27. These lenses 27 are in vertical alignment with the center of the light beam emanating from the lamp 22. The bottom wall 28 of the circular well 26 is provided with an axial opening 29 to permit the passage of the condensed beam of light therethrough.

The top wall 14 of the base 11 is provided with a substantially rectangular depression 30, an end area of which is in vertical alignment with the opening 29. This depression 30 is off-set transversely from the opening 29 and its remote end is in direct communication through an open side 31 with a horizontal projection lens socket 32 defined by the bosses 16. The projection lens socket is adapted to receive therein a projection lens 33 which is held in place firmly against a shoulder 34 by a split retaining ring 35. Obviously, other structurally suitable means may be provided to retain the projection lens in the position illustrated. It is essential, however, that the projection lens be disposed in a vertical plane for purposes to become apparent presently.

The rectangular depression 30 is provided to receive a prism 36, best shown in Fig. 8. This prism has overall dimensions corresponding to the dimensions of the depression 30 so as to fit snugly therein. The prism 36 is substantially rectangular in shape and it includes a top surface 37, perpendicular side surfaces 38 and 39, and a bottom surface 41. The end of the prism disposed below the condensing lenses is cut at a 45° angle to provide an inwardly downwardly inclined flat reflecting surface 42. The other end of the prism likewise is cut at a 45° angle to provide a vertically planar angular flat surface 43, which surface is in substantially axial registration with the projection lens 33.

Obviously a light beam projected from the lamp 22 through the condensing lens 27 enters the prism 36 through the top surface 37 thereof. The beam of light entering the prism as aforesaid strikes the inclined prism end wall and is projected longitudinally therethrough onto the vertically planular inclined surface 43 which projects said beam horizontally through the projection lens 33. The projected light beam strikes a mirror 46 mounted firmly in an angular position on an upwardly inclined surface 47 formed on the back end of the base top wall 14. The reflected light beam then is directed upwardly angularly onto a translucent screen 48 mounted in a shielded opening 49 provided on the upper end of a housing 51 which is arranged over the base 11 in the manner shown and may be detachably secured thereto as by means of a screw 52.

The housing 51 includes a front wall 53, which merges with a top wall portion 54 to enclose the lamp, and side walls 55. The wide slot 56 is cut in the front wall 53 and extends a substantial distance rearwardly along the side walls 55. This slot is of substantial width, as shown, and its bottom edge 57 is in horizontal alignment with the top surface of the prism 36. This slot is adapted to freely receive a negative film carrier 58 preferably of the kind best illustrated in Figs. 4 through 7, inclusive.

As illustrated, the film carrier 58 includes a bottom plate 59, an intermediate plate 61, and a top plate 62. The bottom plate 59 is substantially rectangular in shape and is of a width corresponding substantially to the depth of the slot 56 in the housing walls. The plate 59 also is of a length corresponding substantially to the width of the housing 51 and it is provided on each end edge with a down-turned lip 63 adapted to engage over the housing side walls 55 to prevent transverse displacement thereof when the latter is positioned within said slot. A shallow channel 64 is provided in the top face of the bottom plate 59 to prevent marring of the film as it passes therealong during the feeding of such film through the film carrier. Proper guidance for said film at the entrance and exit ends of the film carrier 58 is afforded by a pair of transversely spaced apart lugs 65 formed on each end of the bottom plate 59. The present disclosure shows the lugs spaced apart to receive an 8 mm. film. Spacing of the lugs further apart will accommodate a 16 mm. film.

A pair of ears 66 is struck upwardly at each end of the bottom plate 59 adjacent its back edge. These ears are apertured, as at 67, each to receive a longitudinal projection 68 provided on the end edges of the intermediate plate 61 whereby said plates 59 and 61 are hingedly connected along their rear edges so as to be movable into open and closed positions to facilitate the threading of the film therebetween. The intermediate plate 61 is preferably of a shape corresponding substantially to the shape of the bottom plate 59. It preferably is provided on its end and front edges with upwardly inclined margins 69 which terminate short of the longitudinal center to provide a gap 70 for a purpose to be explained presently.

The top plate 62 is substantially smaller in its overall dimensions than the plates 59 and 61 and it is provided adjacent the rear ends of its side edges with a pair of projections 71 which extends loosely through apertured lugs 72 preferably struck upwardly out of the body of the intermediate plate 61 adjacent its rear edge. It should be evident at this time that the three plates 59, 61, and 62, are hingedly connected together so as to be movable about substantially common axes into and out of close association one with the other.

All of the plates constituting the negative film carrier are provided with registering cut out areas, indicated at 73, to afford such clearance as is required by the presence of the projection lens mounting. Both plates 59 and 61 are provided with apertures 74 and 75 respectively which are in registering alignment with the path of the light beam passing through the condensing lenses 26. These registering openings are substantially rectangular in shape and afford means whereby images carried on film 76 as it moves over the channel 64 are projected through the prism 36 and projection lens 33, onto the mirror 46 and are reflected against the screen 48 for observation. The opening 75 in the intermediate plate 61 is larger than the underlying opening 74 in the plate 59.

The bottom plate 59 has an aperture 77 which is in register also with the opening 75 in the intermediate plate 58. This aperture is intended to permit free passage therethrough of a piercing tang 78 struck downwardly out of the top plate 62. Normally, the tang 78 is held above the bottom face of the intermediate plate 61 so as not to interfere with free passage of the film 76 over the channel 64. Such normal positioning of the tang 78 is afforded by providing a spring 79 in association with the top plate 62. As best illustrated in Fig. 4, the spring 79 is substantially U-shaped and is provided with in-turned ends 81 which are firmly anchored beneath struck out strap portions 82 in the plate 61. The intermediate or bight portion of the spring 79 rests upon the top face of the intermediate plate 61 so as to thereby normally hold the top plate 62 elevated angularly.

When it is desired to mark the film passing through the film carrier for purposes of removing or identifying a frame or frames being viewed, the top plate 62 is pressed downwardly about its axis preferably by manual finger engagement with the forwardly projecting end 84 of the said plate 62. This forwardly projecting end 84 lies between opposed ends of the margins 69 of the intermediate plate and extends outwardly beyond the front housing wall 53 so as to be readily accessible for such engagement.

Marking of film by means of the tang 78 in the manner described hereinabove, and as illustrated at 85 in Fig. 9, is of particular importance inasmuch as it permits the marking of film in the immediate area of the frame being viewed. Heretofore, when a frame being viewed was to be marked, it was necessary to advance the film several frames so as to bring the selected frame into an accessible position for marking. Obviously, the present manner of marking the film obviates any possibility of erroneous or inadvertent marking.

Although an exemplary form of the present invention has been disclosed in detail in the accompanying drawings and specifically described in the foregoing specification it should be understood that the invention is capable of embodying a wide variety of modifications in detail structure and assembly without depart-

I claim:

1. A film carrier comprising a pair of plates hingedly connected along one edge for movement into open and closed positions, said plates each having an opening, a third plate hingedly connected along one edge to the hinged edge of one of said pair of plates, said third plate having an opening, all of said openings being in registering alignment to permit light rays to pass therethrough and through a film threaded between the pair of plates, means normally holding the third plate spaced from the hinged plates, and a piercing tang on the third plate adapted to pass through the opening in one of said hinged plates and through a hole in the other hinged plate to pierce the film track in the area of the frame in register with the openings in the plates when the third plate is pressed toward the hinged plates.

2. A film carrier comprising a pair of plates hingedly connected along one edge for movement into open and closed positions, said plates each having an opening, a third plate hingedly connected along one edge to the hinged edge of one of said pair of plates, said third plate having an opening, all of said openings being in registering alignment to permit light rays to pass therethrough and through a film threaded between the pair of plates, means normally holding the third plate spaced from the hinged plates, a piercing tang on the third plate adapted to pierce the film track in the area of the frame in register with the openings in the plates when the third plate is pressed toward the hinged plates, and a channel in the film contacting surface of one of said hinged plates.

3. A carrier for strip film having an image carrying portion and an edge portion, comprising in combination: a base plate and a second plate hingedly connected together along a common edge for movement into an open position and a closed position, means for guiding a film between said plates, said base plate having a channel in that surface contiguous said second plate and aligned with said film guiding means to register with said image carrying portion of a film, said base plate further having an opening in said channel for framing a frame of said image carrying portion, and a hole immediately adjacent to said channel and said opening therein to underlie said edge portion of a film, said second plate having an opening therein overlying said base opening and said hole adjacent thereto, a third plate positioned above said second plate and hingedly connected along one edge to the hinged edge of one of said underlying plates, a spring normally holding said third plate in an inclined position relative to said second plate, said third plate having an opening therein through which a beam of light may pass to impinge on a film traversing said aligned openings in said base plate and said second plate, and a piercing tang extending downwardly from said third plate to extend through said opening in said second plate to mate with said hole in said base plate upon moving said third plate toward said second plate, whereby said piercing tang perforates the edge portion of a film adjacent to that frame thereof in register with said aligned openings.

4. A film carrier comprising in combination: a base plate having an opening therein, a second plate contiguous said base plate and having an opening therein in alignment with said base plate opening, means for guiding a film between said plates to traverse said aligned openings therein, means for separating said plates to thread a film in said film guide means, a third plate hingedly connected to one of said contiguous plates, means normally holding said third plate spaced from said second plate, said third plate having an opening therein which is in alignment with said openings in said contiguous plates, to permit light rays to pass therethrough and through a film in said film guide means, and a marking member on said third plate positioned to extend through the opening in said second plate to mark said film in the area of the frame in register with said opening in said base plate when said third plate is moved toward said second plate.

5. A film carrier comprising a pair of plates hingedly connected along one edge for movement into open and closed positions, means for threading a film between said plates, said plates having aligned openings therethrough to permit light rays to pass through a film threaded between said plates, a third plate hingedly connected along one edge thereof to the hinged edge of one of said pair of plates, a spring between said third plate and said one plate to normally hold said third plate away from said one plate, said third plate having a finger tab portion digitally engageable to urge said third plate toward said pair of hingedly connected plates, and a piercing tang on said third plate, said tang being adapted to pierce the film track in the area of a frame in register with the openings in said pair of plates when the third plate is pivotally moved toward said pair of plates.

MICHAEL S. WOLK.

REFERENCES CITED

The following references are of record in the file of this patent:

UNITED STATES PATENTS

| Number | Name | Date |
| --- | --- | --- |
| 1,908,990 | Ledig | May 16, 1933 |
| 1,934,582 | Bausch et al. | Nov. 7, 1933 |
| 1,947,668 | Warmisham | Feb. 20, 1934 |
| 1,948,842 | Curran | Feb. 27, 1934 |
| 2,211,218 | Serruier | Aug. 13, 1940 |
| 2,231,765 | Landrock | Feb. 11, 1941 |
| 2,297,222 | Kemna | Sept. 29, 1942 |
| 2,313,860 | Bogue | Mar. 16, 1943 |
| 2,422,816 | Baia | June 24, 1947 |
| 2,444,732 | Fitch | July 6, 1948 |